H. G. SAHLIN.
CONTROLLER FOR TURBINES.
APPLICATION FILED NOV. 8, 1909.

979,802.

Patented Dec. 27, 1910.
5 SHEETS—SHEET 1.

WITNESSES:
M. E. Flaherty
J. D. McPherson

Henning G. Sahlin
INVENTOR.

BY
ATTORNEY.

H. G. SAHLIN.
CONTROLLER FOR TURBINES.
APPLICATION FILED NOV. 8, 1909.

979,802.

Patented Dec. 27, 1910.
5 SHEETS—SHEET 3.

WITNESSES:
M. E. Flaherty.
J. D. McPherson

INVENTOR.
Henning G. Sahlin

BY
ATTORNEY.

H. G. SAHLIN.
CONTROLLER FOR TURBINES.
APPLICATION FILED NOV. 8, 1909.

979,802.

Patented Dec. 27, 1910.
5 SHEETS—SHEET 4.

Section 5-5

WITNESSES:
M. E. Flaherty.
J. D. McPherson

Henning G. Sahlin
INVENTOR.

BY
ATTORNEY.

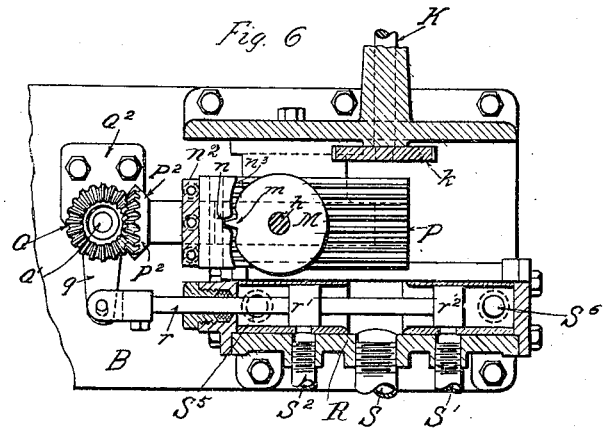
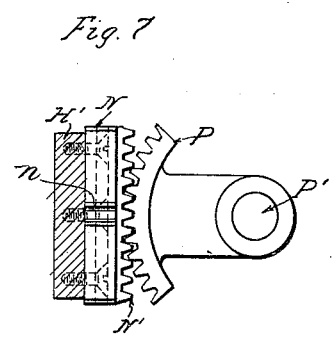
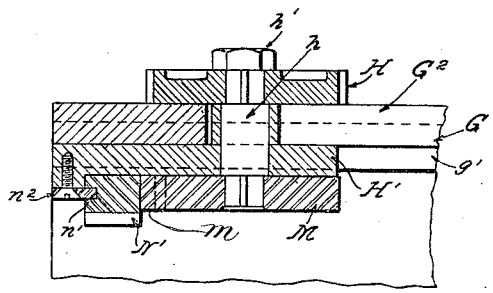

UNITED STATES PATENT OFFICE.

HENNING G. SAHLIN, OF MALDEN, MASSACHUSETTS.

CONTROLLER FOR TURBINES.

979,802.

Specification of Letters Patent.   Patented Dec. 27, 1910.

Application filed November 8, 1909. Serial No. 526,693.

*To all whom it may concern:*

Be it known that I, HENNING G. SAHLIN, of Malden, in the county of Middlesex and State of Massachusetts, a citizen of the United States, have invented a new and useful Improvement in Controllers for Turbines, of which the following is a specification.

My improvement while intended primarily for turbines may be adapted for use with other engines, but it is especially intended for use with water turbines, that is, water wheels of the turbine variety such as are used in mills operated by water power.

It will be understood by reference to the drawings, in which—

Figure 1:
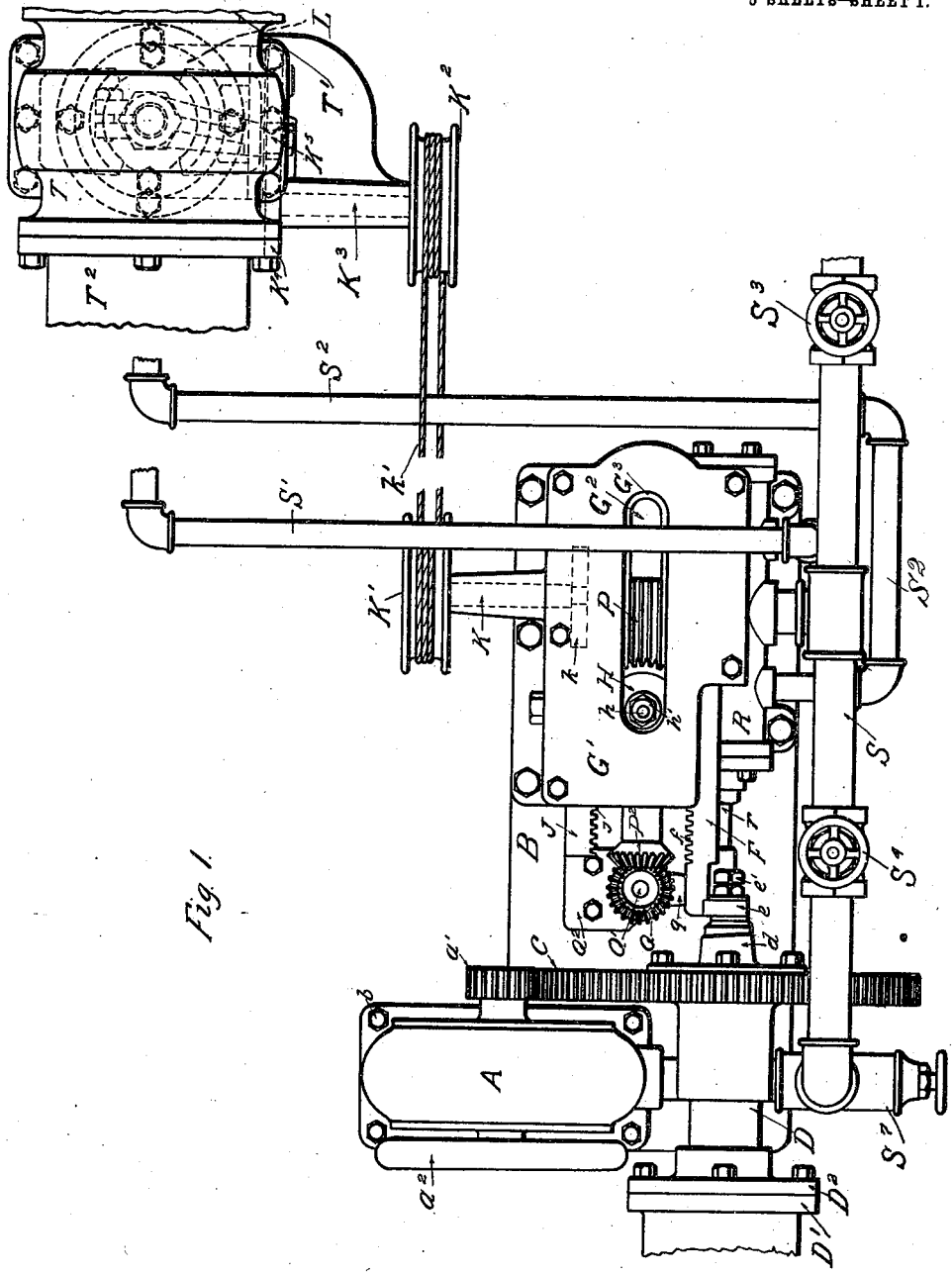
Figure 2:
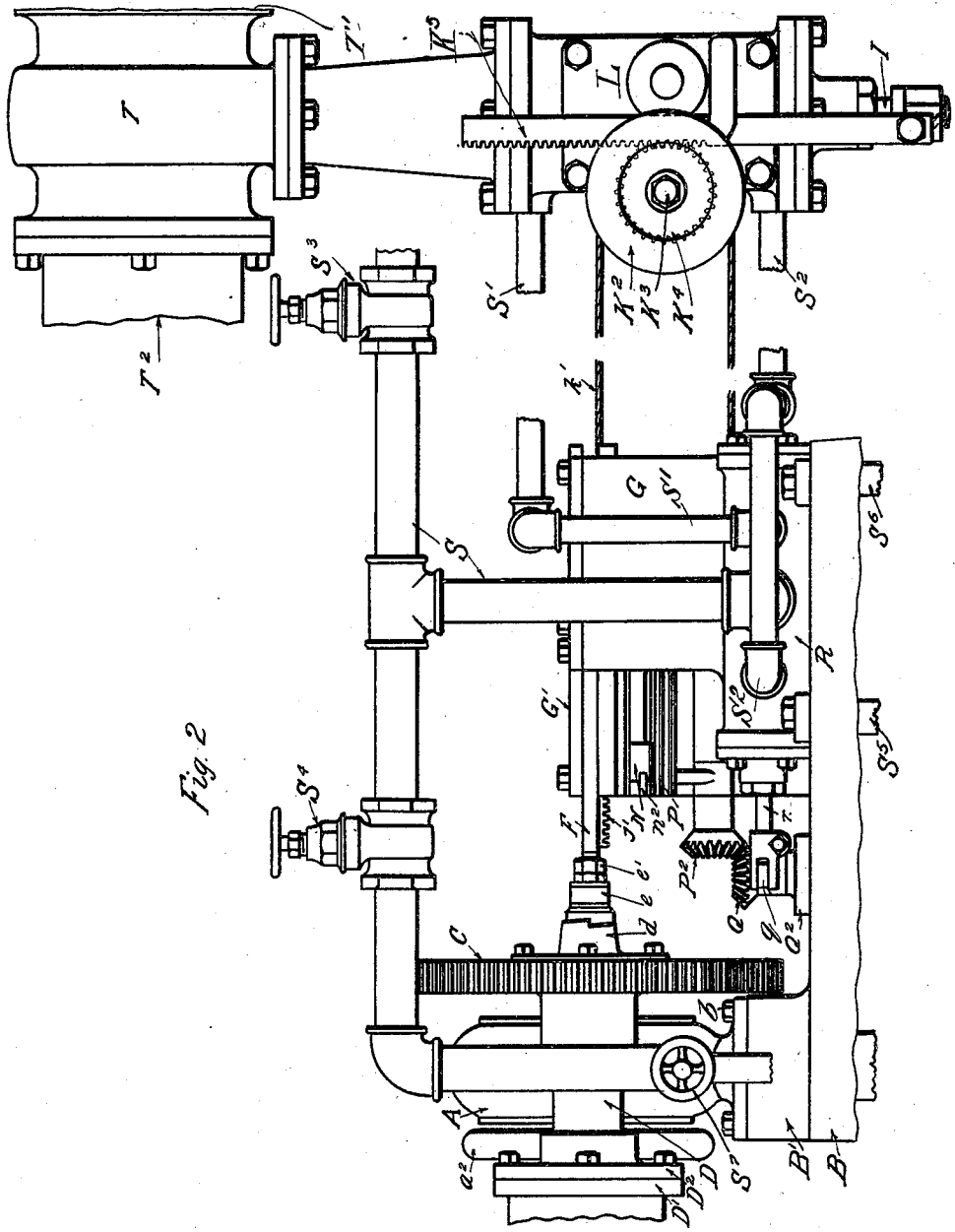
Figure 3:
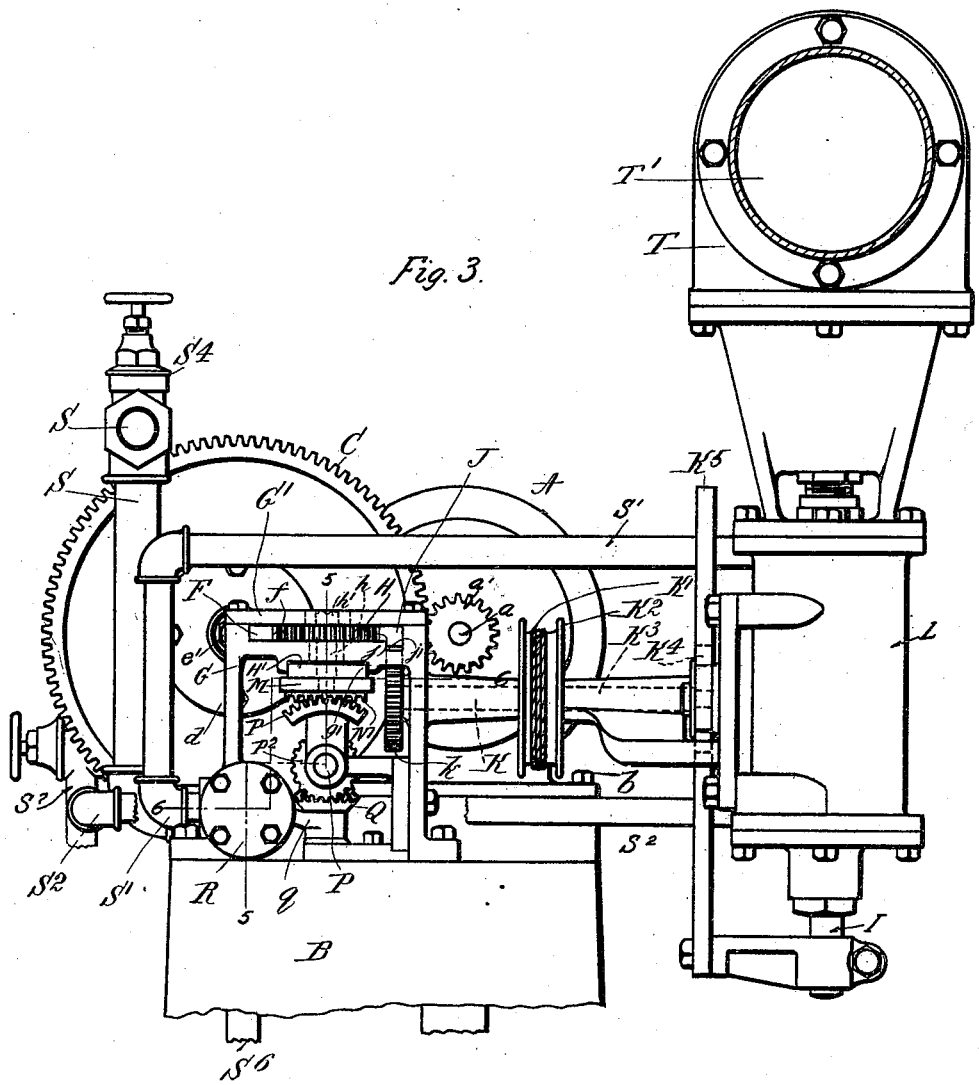
Figures 4, 5:
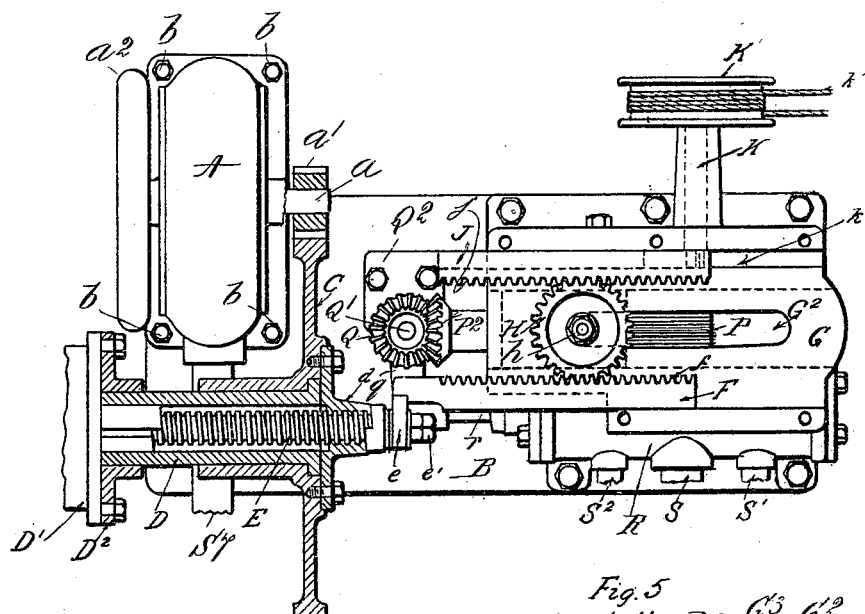

Figure 1 is a top view, Fig. 2 a side elevation, and Fig. 3 an end elevation of a controller embodying my invention, Fig. 4 being a top view partly in section, the cover and gear-carrying box being removed, and Fig. 5 being a section on line 5—5 of Fig. 3, Fig. 6 is a horizontal section showing the segmental rack and valve mechanism, Fig. 7 is an end view of the rack, and Fig. 8 a vertical section through the carriage.

The three elements which are connected by trains of mechanism to bring about the desired result of absolutely uniform speed secured by the control of the steam, water or other fluid by which the engine is operated, are first, the engine shaft itself, second, the throttle valve, and third, a motor which may be set to run at a constant, predetermined speed. Motors of this class are well known in the market and their special construction need not be specified. I prefer to use a water motor as, in the form of my invention which I now describe, water is the element by which the turbine under control is operated. Such a motor is indicated at A. Its casing is mounted upon a standard $B^1$ on the bed B of the machine to which standard it is attached by bolts $b$. Within the casing is a wheel mounted on the shaft $a$ which shaft carries on one end a pinion $a^1$ and on the other end a balance wheel $a^2$. The pinion $a^1$ meshes with a gear C which is mounted to turn freely upon the shaft D coupled to the turbine shaft $D^1$. The turbine itself is not shown, but may be of any ordinary construction.

$D^2$ is a coupling on the end of the turbine shaft by which the governor shaft D is coupled to it.

The shaft D is hollow and within it and splined to it is the screw E, this construction being such that the screw will always rotate with the shaft, but may be moved in or out from the end of the shaft as occasion may require. This movement is given by the gear C which carries a nut $d$ engaging the threads of the screw. In the normal operation of these parts, that is when they are running as they should, the gear C and shaft D will rotate in unison and under these circumstances of course, as the nut and screw rotate at the same speed, the nut will have no effect to cause the screw to progress or recede, but if the gear and the shaft and screw rotate at different speeds the nut will cause the screw to advance or recede as the case may be. To the end of the screw E is attached by a collar $e$ and bolt $e^1$ a rack F which slides in a groove or way formed by the top of the frame G and its cover $G^1$, this frame being supported at the base of the machine. This rack F has teeth $f$ which engage with a pinion H on a stud $h$ mounted on a carriage $H^1$ which slides in grooves $g^1$ in the frame G. A nut $h^1$ holds the pinion H on the stud $h$. The lower part of the stud $h$ passes down through an elongated slot $G^2$ in the frame G and through the carriage $H^1$ and carrying at its lower end a one toothed gear M to be described below.

Opposite the rack F is a second rack J which also slides between the top of the frame G and its cover $G^1$ but is L-shaped in cross section, having a vertical section which depends from its outer edge and has a set of teeth $j^1$ on its lower dependent edge (see Fig. 5). It also has teeth $j$ corresponding with the teeeth $f$ in rack F which engage the pinion H. It will be seen therefore that if either one of the racks F, J is moved while the other is at rest, the pinion H and carriage $H^1$ will travel in either direction according to which the rack is moved. The slot $G^2$ is for the purpose of allowing this movement and to insure sufficient clearance for the nut $h^1$ I provide a similar slot $G^3$ in the cover $G^1$. The rack J is connected up in the following manner: Teeth $j^1$ engage a pinion $k$ on the end of a shaft K mounted in suitable bearings and carrying at its outer end a pulley $K^1$. As shown this pulley $K^1$ is connected by a rope $k^1$ with a second pulley $K^2$ on a shaft $K^3$ mounted in suitable bearings upon a cylinder L. It may be connected, however, by any other mechanical connection. This shaft also carries a gear $K^4$ which meshes with a rack $K^5$ connected at its lower end with a piston rol $l$ carrying a piston (not shown) which runs in said cylinder L. By this means it will be seen that upon the movement of the piston in the cylinder L a corresponding movement is given to the pulley $K^2$ which acting through the rope and pulley K gives a movement to the rack J and unless there is a movement of the said piston the piston acts to hold the rack J firmly in place.

The pinion H and gear M are keyed to the stud $h$ so as to move in unison. The gear M carries a tooth $m$ which engages a notch $n$ in a rack N (see Figs. 6, 7 and 8). This rack is grooved as at $n^1$ and a key $n^2$ fitting said groove is screwed to the carriage to serve as a way along which the rack may slide. The rotating of the gear M by the racks F, J, and pinion H causes a limited movement to be given to the rack N, limited because of the fact that it is moved only by the single tooth $m$ which releases after turning through a small arc, after which it is locked because its front edge on both sides of the notch is curved as at $n^3$ to conform to the circle of the gear M so that it will be locked thereby. The rack N also has teeth $N^1$ on its under side which engage with the segment P. This segment is quite long so as to allow the rack N to engage it whatever may be the position of the carriage $H^1$, that is to say, at whichever end of the frame G it may be. This segment P is mounted on a shaft $P^1$ carried in bearings mounted on the frame G and has at one end a bevel gear $P^2$ which engages a similar gear Q mounted upon an upright stud $Q^1$ in a support $Q^2$ on the bed B. The gear Q carries an arm $q$ which is connected to a valve rod $r$.

R is a cylinder within which are two valves $r^1$, $r^2$ both mounted on the rod $r$. To this cylinder is led by the pipe S a water supply under pressure and from this cylinder are two connections $S^1$, $S^2$, both of which lead (as shown in Fig. 2) to the cylinder L, one upon each side of the piston therein, so that according to the position of the valves $r^1$, $r^2$ in the cylinder R the water led to the cylinder R by the pipe S is fed to the cylinder L either above or below the piston contained therein. The piston rod $l$ carries at its upper end a shut-off of ordinary construction which controls a supply of water or other fluid leading to the turbine. T is the casing for such valve, the inlet in said casing being $T^1$ and the outlet $T^2$, the pipe $T^2$ leading to the turbine. The pipe S is connected to a main supply pipe which may be connected from the main source of water supply and is controlled by a valve $S^3$, this pipe also supplying the motor, a valve $S^4$ being used so that the water may be gradually let on to the motor.

$S^5$ and $S^6$ are exhaust pipes.

Water should be supplied to the motor at a pressure greater than that required and a relief valve $S^7$ is used to reduce the pressure to the required pressure.

It is believed that the operation of my device can now be understood. To start it up, it being supposed that the parts are all in the position shown in the drawings, the valve $S^3$ is opened by turning the hand wheel shown in Fig. 1. The valve $S^4$ is also opened slowly. This supplies water to the motor and also the pipe S by which water is fed to the cylinder R. As the motor starts up its pinion $a^1$ operates the gear C which as the shaft D is not rotating, causes the screw E to be fed outwardly from the shaft. This moves the rack F so that it turns the pinion H causing it to move the single toothed gear M below it and causing the carriage at the same time to travel in the same direction with the rack F. The turning of the single toothed gear M causes the segment P to turn with its gear $P^1$ and so turn the gear Q which moves the valve rod $r$, thus throwing the valves from their neutral position as shown in Fig. 5 to such a position that communication is established between the water inlet at S and the pipe $S^1$, and also between pipe $S^2$ and the corresponding exhaust. This carries the water to the upper part of the cylinder L and drives the piston down toward the bottom of the cylinder, the water below the piston escaping through the exhaust. This opens the gate valve at T and allows the entry of water to the turbine. This same act, however, forces down the rack N by means of which the rack J is drawn to the right in Fig. 5 so that it tends to close the valve, thus changing or adjusting rather the position of the valve rod $r$ and its connecting valves $r^1$, $r^2$ to the normal running speed of the engine, for as water has been supplied through the valve T to the engine the engine has gradually gathered speed and its shaft D beginning to approach in speed the speed of the gear C the longitudinal movement of the screw E slows down and eventually stops owing to the fact that the nut carried by the gear G and the screw are moving at the same rate of speed. When this situation has arisen the parts are all working under normal conditions. When, however, there is any variation in the speed of the turbine because, for example, of an additional load upon it or a reduction of the load, the screw will adjust itself to the situation (the motor always rotating at the same rate of speed), the screw immediately feels the change and operates to throw the rack F in either direction as the case may require, thus controlling the movement of the valves $r^1$, $r^2$, and consequently the position of the piston in the cylinder L and the gate valve in the casing T.

It will be seen that in the form of my invention shown in the drawings the pulleys are of the same diameter and the screw E and the piston rod in the cylinder are of the same length so that the two will always travel in unison and thus there is a positive and direct control of the position of the throttle of the valve and consequently of the supply of fluid by which the turbine is being operated.

As the piston is moved by the working fluid, say water, in either direction the pipe $S^1$, $S^2$ which is not supplying the working fluid acts as an exhaust from the cylinder L carrying the fluid which piston expels back into the valve chamber or cylinder R from which it escapes through the exhaust $S^5$ or $S^6$ as the case may be.

In cases where a quick action is needed the length of the screw should be shorter in proportion to the length of travel of the piston. It is obvious that there may be variations in the details of construction which will be within the claims, for I do not mean to limit myself to the precise embodiment of my invention shown in the drawings. The relief valve $S^7$ is not shown in detail as such valves are well known in the art.

What I claim as my invention is:

1. In a controller comprising a gate valve, a gate valve motor, a valve to supply a working fluid to said gate valve motor, means for operating said valve comprising a constant motor, an engine shaft, a rack, means whereby said rack will be operated by a difference in speed between said constant motor and said shaft, a pinion and connections between said pinion and said valve whereby its movement in either direction will operate said valve mechanism to control the supply of said working fluid to said gate valve motor.

2. In a controller comprising a gate valve, a gate valve motor, a valve to supply a working fluid to said gate valve motor, means for operating said valve comprising a constant motor, an engine shaft, a rack, means whereby said rack will be operated by a difference in speed between said constant motor and said shaft, a pinion, a second rack in mesh with said pinion and connected to the moving element in said gate valve motor whereby the travel of said pinion will be controlled, and connections between said pinion and said valve whereby the movement of said pinion will control the position of said valve and the supply of said working fluid to said gate valve motor.

3. In a controller, a gate valve motor, a constant speed motor, an engine shaft, two sliding racks one connected to and operated by said gate valve motor and the other connected to and operated by the joint action of said constant speed motor and said engine shaft, and a pinion in mesh with both racks and capable of travel along each rack, a valve controlling the supply of working fluid to said gate valve motor, and connections between said valve and said pinion, whereby the travel of said pinion in either direction will cause a corresponding movement of said valve.

4. In a controller, a constant speed motor, an engine shaft, a rack and connections between said rack, said constant speed motor and said engine shaft, whereby said rack will remain stationary when said motor and said shaft are running at constant speed, a gate valve, a gate valve motor, and means for controlling the supply of working fluid thereto comprising a valve, a carriage, connections between said valve and said carriage whereby the movement of the carriage in either direction will cause a corresponding movement of said valve, a pinion mounted on said carriage and engaging said rack, and means connected to said gate valve motor and comprising a rack in mesh with said pinion whereby a different movement is given to said pinion, carriage and valve, as described.

5. In a controller, a valve for controlling the supply of working fluid to a gate valve motor and means for operating it comprising a segment gear, and connections whereby the oscillating movement of said segment gear will give a reciprocating movement to said valve, and means for oscillating said segment gear comprising a rack having a notch therein, a single toothed gear adapted to engage the notch in said rack, and a pinion mounted to turn with said single toothed gear, and means for operating said pinion.

6. In a controller, a valve for controlling the supply of working fluid to a gate valve motor and means for operating it comprising a segment gear, and connections whereby the oscillating movement of said segment gear will give a reciprocating movement to said valve, and means for oscillating said segment gear comprising a rack having a notch therein, a carriage, a stud mounted thereon, a single toothed gear mounted on said stud and adapted to engage the notch in said rack and move it, a pinion also mounted on said stud to turn therewith, and means for turning said pinion and causing said carriage to travel, said rack being mounted on said carriage and said segment gear being of sufficient length to engage said rack during its entire travel with said carriage.

HENNING G. SAHLIN.

Witnesses:
M. E. FLAHERTY,
J. D. McPHERSON.